_(12)_ United States Patent
Lefevre et al.

(10) Patent No.: US 8,797,538 B2
(45) Date of Patent: Aug. 5, 2014

(54) INTERFEROMETER WITH A FIBER OPTIC HAVING A HIGH PMD IN COUPLED MODE, FIBER OPTIC GYROSCOPE (FOG), AND INERTIAL NAVIGATION SYSTEM INCLUDING SUCH A GYROSCOPE

(75) Inventors: Herve Claude Lefevre, Paris (FR); Cedric Alain Jacky Molucon, Paris (FR); Joachin Honthaas, Paris (FR)

(73) Assignee: IXBlue, Marly le Roi (FR)

( * ) Notice: Subject to any disclaimer, the term of this patent is extended or adjusted under 35 U.S.C. 154(b) by 387 days.

(21) Appl. No.: 13/389,085

(22) PCT Filed: Aug. 5, 2010

(86) PCT No.: PCT/FR2010/051656
§ 371 (c)(1),
(2), (4) Date: Feb. 6, 2012

(87) PCT Pub. No.: WO2011/015788
PCT Pub. Date: Feb. 10, 2011

(65) Prior Publication Data
US 2012/0133923 A1 May 31, 2012

(30) Foreign Application Priority Data

Aug. 6, 2009 (FR) .................................... 09 55532

(51) Int. Cl.
*G01C 19/72* (2006.01)
(52) U.S. Cl.
USPC ....................................................... 356/460

(58) Field of Classification Search
CPC ..... G01C 19/72; G01C 19/721; G01C 19/722
USPC ......................................... 356/460, 461, 465
See application file for complete search history.

(56) References Cited

U.S. PATENT DOCUMENTS 6,801,319 B2 10/2004 Szafraniec et al.
2010/0033729 A1* 2/2010 Qiu et al. ..................... 356/460

FOREIGN PATENT DOCUMENTS

EP 1416251 A1 5/2004

OTHER PUBLICATIONS

Gordon and Kogelnik: "PMD fundamentals: Polarization mode dispersion in optical fibers", 2000, PNAS, vol. 97, No. 9, pp. 4541-4550, XP-002577536.
International Search Report, dated Nov. 12, 2010, in Application No. PCT/FR2010/051656.

* cited by examiner

*Primary Examiner* — Jonathan Hansen
(74) *Attorney, Agent, or Firm* — Young & Thompson (57) ABSTRACT

Disclosed is a fiber optic interferometer including: a wideband optical source having a decoherence time $\tau_{DC}$; a coil including N turns of a fiber optic with length L; an optical element separating the incident beam into first and second beams coupled to first and second ends of the fiber respectively, so the first beam travels through the fiber optic in a first direction and the second beam travels through the fiber optic in a counter propagating direction; and a detector detecting the intensity of the output beam. The fiber optic is a high polarization mode dispersion type, and the length L of the fiber optic coil is more than twice the fiber correlation length, so the fiber operates in a coupled PMD mode, and the propagation differential group delay between two orthogonal polarization states, accumulated over the length of the fiber, is greater than the decoherence time of the source.

20 Claims, 4 Drawing Sheets

INTERFEROMETER WITH A FIBER OPTIC HAVING A HIGH PMD IN COUPLED MODE, FIBER OPTIC GYROSCOPE (FOG), AND INERTIAL NAVIGATION SYSTEM INCLUDING SUCH A GYROSCOPE

The field of the invention is that of the interferometer gyroscopes based on the Sagnac effect, and more particularly that of the fiber-optic gyroscopes (FOG).

The fiber-optic gyroscopes are more and more used for rotation measurements in inertial navigation systems because of their qualities in terms of reliability, compactness and extreme sensitivity, in particular when any external navigation assistance is impossible or unusable. A fiber-optic gyroscope is a Sagnac-ring interferometer, as described in FIG. 1. A fiber-optic gyroscope generally includes a wide-spectrum source 1, a first beam splitter 2 (referred to as the source-receiver splitter), an input-output polarization and spatial single-mode filter 3, a second splitter 4 (referred to as the coil splitter), an optical fiber coil 5 and a detector 6. In a manner known per se, a gyroscope generally comprises a modulator (phase or frequency modulation) and an adapted signal processing system. The spectral width of the source $\Delta\lambda_{FWHM}$ is generally comprised between 0.1% and 10% of the central emission wavelength $\lambda$. The spectral width may correspond to the emission width of the source. A narrow source (of natural width<1 nm), swept over a wider spectral range (1-100 nm), may also be used.

In a reciprocal configuration, after being passed through the polarizer and the spatial filter, the incident light beam is split to produce a first and a second secondary beam. The first beam, which has been polarized at the input, is injected via a first end of the coil, in the clockwise direction for example, and emerges from the second end of the coil to once again pass through the polarizer. The second beam, which has also been polarized at the input, is injected via the second end of the coil, in the counterclockwise direction, and emerges from the first end of the coil to once again pass through the polarizer. Downstream the polarizer, the first and second beams interfere with each other and these interferences are read at the detector.

By way of illustration, if the gyroscope is inactive, the first and second light beams follow identical paths and are in phase with each other at the detector. On the other hand, if the gyroscope is in motion, more precisely if the coil turns in the clockwise direction around its axis, the first light beam follows the "longest" arm of the interferometer, whereas the second light beam follows the "shorter" arm of the interferometer. The rotation of the coil thus generates a phase shift between the first and second light beams circulating in opposite directions along the optical fiber. This phase shift changes the state of interference of the first and second light beams at the detector.

In order for such a rotation sensor to operate, it must be ensured that the polarization state in the interferometer is not liable to cause the extinction of the optical power at the output of the polarizer and thus at the detector, or at least, an attenuation that is incompatible with a reliable detection.

In the state of the art, two known solutions exist. The first known solution consists in using a coil formed of a single-mode fiber referred to as a polarization maintaining fiber (or PM fiber). Actually, a polarization maintaining fiber is a very birefringent fiber having two orthogonal axes, referred to as main axes. Such a fiber is capable of preserving the polarization of the light beam all along its travel through the fiber if the polarization of this beam is aligned with one of its main axes. This is made by ensuring a null or low coupling between the main modes of the fiber. For example, it is known to make a fiber having a low coupling between its main modes, by forming its core with an elliptic shape or by creating stress fields in the fiber.

When a polarization maintaining fiber is used in a gyroscope, the fiber must be accurately oriented relative to the axis of the input-output polarizer, so as not to cause the signal extinction. Therefore, if at the input of the fiber, the axis of the polarizer is parallel to one of the main modes of the fiber, the light will emerge from the fiber with a polarization along the main mode selected. It is also required that, at the output of the fiber, the selected main mode is still parallel to the axis of the polarizer. In the most unfavorable configuration, at the output of the fiber, the selected main mode of the fiber and the axis of the polarizer are orthogonal to each other, so that there is a full blackout of the light power striking the detector. No detection can therefore be carried out. In less unfavorable relative arrangements, i.e. where the selected main mode and the axis of the polarizer are not orthogonal to each other, the output polarizer substantially attenuates the emerging beam, which reduces accordingly the power striking the detector, and thus the sensitivity of the gyroscope.

As a consequence, during the industrial manufacturing of a FOG, particular care must be taken in the step of mounting the optical fiber coil so that a same main axis is aligned to the axis of the polarizer at both ends of the PM fiber, in such a manner that the light power incident on the detector is compatible with a measurement of a signal variation. This alignment step is often carried out manually. It is accordingly a delicate and expensive step.

Moreover, the attenuation in a PM fiber is of the order of 1 dB/km. Also, the sensitivity of a FOG is proportional to the fiber coil length, which is generally comprised between 0.1 km and 10 km. A PM fiber length of 10 km thus corresponds to a signal attenuation of 10 dB, which is yet a very high attenuation. Due to the attenuation per unit length, the use of a very long PM fiber is thus inappropriate in a FOG. The FOGs based on the use of a PM fiber have generally in practice a coil length limited to about ten kilometers, which also limits their sensitivity.

Moreover, the polarization maintaining fiber is more expensive than the conventional fibers, which do not preserve the polarization.

The second known solution consists in using, on the one hand, a coil formed of a standard single-mode fiber (commonly referred to as "Telecom fiber" or SM (Single Mode) fiber), thus without polarization preservation, and on the other hand, depolarizers referred to as "Lyot polarizers", provided for example at the input and the output of the fiber coil (cf. U.S. Pat. No. 6,801,319 Szafraniec et al., Symmetrical depolarized fiber-optic gyroscope). In the U.S. Pat. No. 6,801,319, the first secondary beam, polarized by passing through the input-output polarizer, is depolarized by passing through the Lyot depolarizer, before being injected into the SM fiber coil in the clockwise direction. The light power injected into the coil is therefore distributed in all the polarization directions, in a homogeneous way. At the other end of the coil, it is hence sure that a fraction of the injected light power has a polarization compatible with the axis of the input-output polarizer, so that there is always a sufficient light power downstream the input-output polarizer, because only half the intensity of a depolarized beam is lost after passing through the polarizer. A similar optic path is followed by the second secondary beam injected into the fiber coil in the counterclockwise direction. Finally, whatever the relative orientation of the fiber relative to the polarizer during the assembly of the gyroscope, the first and second beams interfere with each other at the detector.

A SM fiber without polarization preservation has the advantage that it is cheap and provides a less restrictive assembly. But this solution has the drawback that it requires the use of Lyot depolarizers, which are expensive and whose integration with the fiber coil complicates the manufacturing of the FOG.

Finally, the attenuation in a SM fiber is currently at least of 0.25 dB/km. For a fiber length of 40 km, the signal attenuation is thus of at least 10 dB, which determines in practice the maximum length for the SM fiber FOG. The fiber length of a SM fiber FOG is generally comprised between 0.1 km and 20 km.

Generally, any optical fiber shows a Polarization Mode Dispersion (PMD) (see, for example: Fundamentals of Optical Fibers, John A. BUCK; 2004: pages 161-172). More precisely, it is considered that a fiber has two PMD regimes as a function of the fiber length L that is used.

A first regime referred to as "intrinsic", in which the group propagation time difference between the two main polarization modes, denoted DGD (Differential Group Delay), increases linearly with the fiber length L. The slope of this linear law is denoted $PMD_i$, for Intrinsic Polarization Mode Dispersion. Thus, in this intrinsic regime;

$$DGD = PMD_i \times L$$

where the $PMD_i$ coefficient is linked to the effective group index difference between the orthogonal modes $$\left( \Delta Neff = \Delta n_{eff} - \lambda \times \frac{d\Delta n_{eff}}{d\lambda} \right),$$

$\Delta N_{eff}$ being the effective group index difference between the orthogonal modes and c the speed of light in vacuum:

$$PMD_i = \frac{\Delta Neff}{c}$$

The $PMD_i$ is generally expressed in ps/km.

This intrinsic regime corresponds to a birefringence. A beat length $\Lambda$ may be defined, which is the fiber length at the end of which the DGD is equal to the period $T(=\lambda/c)$ of the wave, i.e.:

$$T = PMD_i \times \Lambda$$

$$T = \frac{\Delta Neff}{c} \times \Lambda$$

This intrinsic behavior continues up to a length $2L_c$, where $L_c$ is referred to as the correlation length of the fiber (see: Fundamentals of Optical Fibers, John A. BUCK; 2004: pages 161-172).

For a fiber length L higher than $2L_c$, the regime becomes a so-called "coupled" regime, where the DGD then increases as the square root of the length. The coefficient of this root law is denoted $PMD_c$:

$$DGD = PMD_c \times \sqrt{L} \text{ when } L > 2L_c$$

$$PMD_c = \frac{\Delta Neff}{c} \times \sqrt{2L_c} = \frac{DGD}{\sqrt{L}}$$

The $PMD_c$ is generally expressed in ps/√km.

The following model can thus be defined, which is true for any type of fiber:

for $L < 2L_c$: $DGD(L) = PMD_i \times L$ for $L > 2L_c$: $DGD(L) = PMD_c \times \sqrt{L}$ and thus for $L=2L_c$: $DGD(2L_c) = PMD_i \times 2L_c = PMD_c \times \sqrt{2L_c}$.

Figure 2:
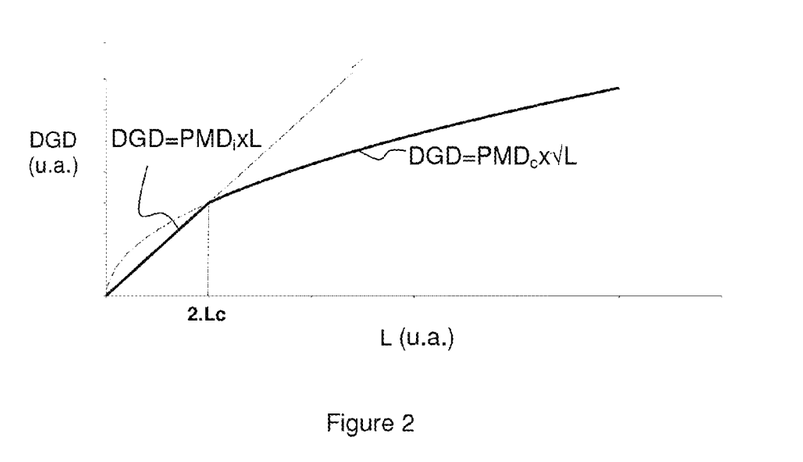
FIG. 2 schematically shows a curve of variation of the differential group delay (DGD) of the polarization modes as a function of the fiber length L and indicates the two propagation regimes: the intrinsic regime and the coupled regime.

Hence, any fiber has a characteristic curve of its DGD as a function of the length L as schematically shown in FIG. 2.

In practice, a polarization maintaining (PM) fiber is characterized by a beat length $\Lambda$ of the order of 3 mm at a wavelength of 1550 nm, i.e. $\Delta Neff \approx 5.10^{-4}$, hence $PMD_i \approx 1.5$ ns/km. The length $2 \times L_c$ is of the order of about 100 km, from which is deduced $PMD_c \approx 15$ ns/√km (cf. PM fiber curve in FIG. 3).

A standard SM fiber is characterized by a beat length $\Lambda$ of the order of 15 m at 1550 nm, i.e. $\Delta Neff \approx 1.10^{-7}$ at 1550 nm, hence $PMD_i \approx 0.03$ ps/km. It is also characterized by $PMD_c \approx 0.03$ ps/√km. It is deduced therefrom a length $L_c$ of about 5 m (cf. SM curve in FIG. 3).

A FOG based on the use of a polarization maintaining fiber operates in intrinsic regime, with a fiber length L comprised between 0.1 km and 10 km. This length L is lower that the length $2 \times L_c$ (generally 100 km), which avoids the coupling between orthogonal polarization modes. The maximum length L is limited in practice by the attenuation of the fiber (about 1 dB/km, i.e. 100 dB for 100 km).

A FOG based on the use of a standard SM fiber operates in coupled regime, because the correlation length is very short, but the value of the $PMD_c$ is very low and it is necessary to use Lyot depolarizers to obtain a homogeneous interference pattern of the polarization modes.

Generally, the PMD of a fiber causes a spreading of the input pulses, which limits the bandwidth of a fiber. According to the prior art, the aim is therefore to produce fibers with PMD values that are low, stable in time and insensitive to the variations of the surrounding conditions, so as to increase the bandwidth of the fibers.

One object of the invention is to manufacture a good sensitivity and cheap fiber-optic interferometer. A preferred application of the interferometer of the invention is a fiber-optic gyroscope.

For that purpose, the present invention more particularly relates to a fiber-optic interferometer including a wideband optical source capable of emitting an incident optical beam with a central wavelength $\lambda$ and a spectral width $\Delta\lambda_{FWHM}$ (FWHM, for Full Width at Half Maximum) of typically 0.1% to 10% of $\lambda$ and having a decoherence time $\tau_{DC}$, where $$\tau_{DC} = \frac{\lambda^2}{c \cdot \Delta\lambda_{FWHM}},$$

a coil with N turns of a single-mode optical fiber of total length L, said fiber having a first and a second end, optical means capable of splitting the incident beam into a first and a second beam coupled to the first and the second end of the optical fiber, respectively, so that the first beam travels through the optical fiber in a first direction and the second beam travels through the optical fiber in a counter-propagating direction, said optical means being capable of combining into an output beam the two beams emerging respectively from the two ends after propagation through the fiber, and a detector capable of detecting the interference of the output beam.

According to the invention, the optical fiber of the coil is an optical fiber having a high polarization mode dispersion (PMD), the length L of the optical fiber coil being higher than twice the correlation length of the fiber, $L > 2 \cdot L_c$, so that the fiber operates in coupled regime and the group propagation time differential (DGD) between two orthogonal polarization states cumulated over the length L of the fiber is higher that the decoherence time of the source:

$$DGD = PMD_c \times \sqrt{L} > \tau_{DC} = \frac{\lambda^2}{c \cdot \Delta\lambda_{FWHM}}.$$

A preferred embodiment relates to a fiber-optic gyroscope including an interferometer according to the invention, in which the optical means include a bidirectional optical splitter capable of spatially splitting the incident beam into a first and a second beam coupled to the first and the second end of the optical fiber, respectively, so that the first beam travels through the optical fiber in a first direction and the second beam travels through the optical fiber in a counter-propagating direction, said splitter being capable of combining into an output beam the two beams emerging respectively from the two ends after propagation through the fiber, and a spatial single-mode filter and a polarizer capable of receiving the incident beam from the source and of transmitting said linearly polarized spatial single-mode incident beam to the optical splitter.

According to a particular embodiment, the gyroscope of the invention includes a splitter capable of spatially splitting the incident beam coming from the source and the output beam and of transmitting the incident beam to the fiber coil and the output beam to the detector, respectively.

According to a preferred embodiment of the gyroscope of the invention, the optical fiber has a DGD cumulated over the fiber length L higher than one hundred times the decoherence time of the source $$DGD > 100 \cdot \tau_{DC}.$$

According to a particular embodiment of the gyroscope of the invention, the optical fiber is a birefringent fiber having a PMD coefficient in coupled mode, $PMD_c$, comprised between 1 and 1000 ps/√km.

According to a particular embodiment of the gyroscope of the invention, the optical fiber is a birefringent fiber having a group effective index difference between orthogonal polarization modes $$\left( \Delta Neff = \Delta n_{eff} - \lambda \times \frac{d\Delta n_{eff}}{d\lambda} \right)$$

at the wavelength $\lambda$ comprised between $10^{-6}$ and $2.10^{-4}$.

According to a preferred embodiment of the gyroscope of the invention, the length L of the fiber coil is comprised between 0.1 km and 20 km.

According to a preferred embodiment of the gyroscope of the invention, the wavelength $\lambda$ of the source is comprised between 800 and 1600 nm and the spectral width $\Delta\lambda_{FWHM}$ is comprised between 0.1% and 10% of $\lambda$.

The invention also relates to an inertial navigation system including a gyroscope according to the invention.

The present invention also relates to the features which will appear in the following description and which will be have to be considered individually or in any technically possible combination.

This description is given by way of non-limitative example and will make it possible to better understand how the invention can be implemented with reference to the appended drawings, in which.

In contrast with the two conventional cases (the standard SM fiber with low values of $PMD_i$, $PMD_c$ and $L_c$ and operating in the coupled regime, and the polarization maintaining PM fiber with very high values of $PMD_i$, $PMD_c$ and $L_c$ and operating in the intrinsic regime), the invention proposes to use a fiber with high values of $PMD_i$ and $PMD_c$ and operating in the coupled regime. Such fiber will be defined as HPMD$_c$ fiber (coupled High Polarization Mode Dispersion fiber).

An example of HPMD$_c$ fiber is a fiber operating in coupled regime, having a high $PMD_i$ of the order of a few hundreds of ps/km and a $PMD_c$ of a few hundreds of ps/√km. For example, PMDi≈500 ps/km and PMDc≈150 ps/√km:

|  | PM fiber | HPMD$_c$ fiber | SM fiber |
|---|---|---|---|
| $PMD_i$ | High: a few ns/km | Mean: a few 100 ps/km | Low: a few 0.1 ps/km |
| $2L_c$ | >100 km | <100 m | <20 m |
| $PMD_c$ | High: a few 10 ns/√km | Mean: a few 100 ps/√km | Low: a few 0.01 ps/√km |
| Operating regime | Intrinsic | Coupled | Coupled |

A HPMD$_c$ fiber may be made with a technology similar to that of the PM fibers (stress bars or elliptic core) but with reduction of its birefringence ($\Delta N_{eff}$ of the order of 1 to $2.10^{-4}$ compared to $5.10^{-4}$ for a PM fiber), which significantly simplify its manufacturing. In other words, a HPMD$_c$ fiber has a $PMD_i$ comprised between ~3 ps/km and ~700 ps/km.

Figure 3:
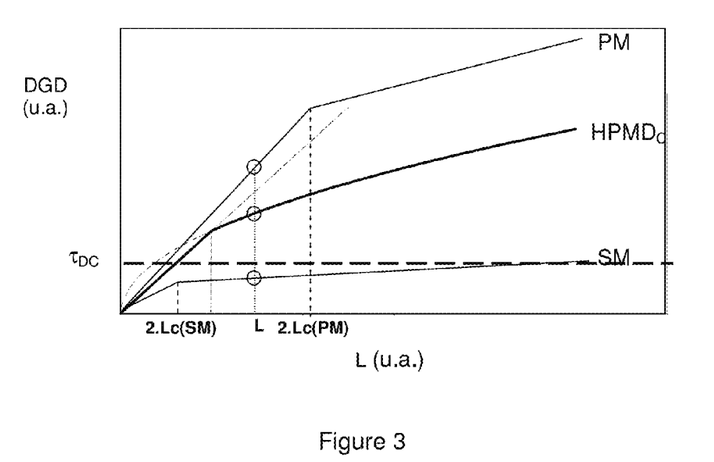
FIG. 3 schematically shows the DGD curves of three types of fibers: a single-mode SM fiber (non birefringent), a polarization maintaining (PM) fiber, and a fiber with a high polarization mode dispersion in coupled regime (HPMD$_c$)

FIG. 3 schematically shows the DGD curves as a function of the fiber length L used, for the three types of fibers: SM, PM and HPMD$_c$. The circle represents for each type of fiber the point corresponding to the regime of use in a FOG with a fiber coil of length L.

Figure 4:
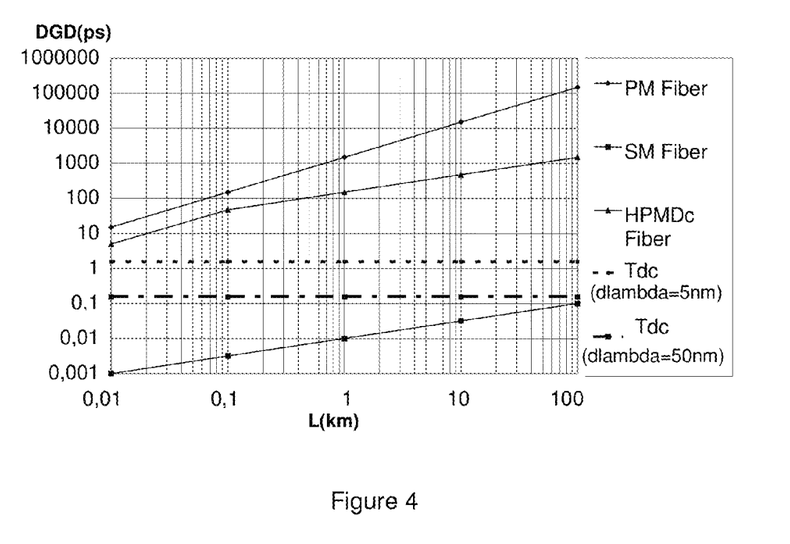
FIG. 4 shows numerical examples of DGD as a function of the length L for three types of fibers, as well as the levels of decorrelation times corresponding to sources of different spectral widths centered around 1550 nm.

FIG. 4 shows a numerical example of DGD curves as a function of the fiber length (logarithmic scales in abscissa and in ordinate) and indicates the level of decorrelation time for sources of different spectral widths (5 nm and 50 nm, respectively).

The Stokes-Mueller formalism and the Poincaré sphere make it possible to define and represent the polarization state of a light beam. See for example: "Etude de la dispersion modale de polarisation dans les systèmes régénérés optiquement", thesis of Benoit Clouet, 15 Jan. 2009, pages 37-56 and 244; J. P. Gordon, H. Kogelnik, PMD fundamentals: "Polarization mode dispersion in optical fibers", Proceedings of the National Academy of Sciences PNAS, Vol. 97, No. 9, April 2000, pp. 4541-4550; P. K. A. Wai, C. R. Menyuk, "Polarization mode dispersion, decorrelation, and diffusion in optical fibers with randomly varying birefringence" IEEE Journal of Lightwave Technology, Vol. 14, No. 2, February 1996, pp. 148-157; M. Midrio, "Nonlinear principal states of polarization in optical fibers with randomly varying birefringence", Journal of Optical Society of America B, Vol. 17, No. 2, February 2000, pp. 169-177; G. J. Foschini, C. D. Poole, "Statistical theory of polarization dispersion in single mode fibers", IEEE Journal of Lightwave Technology, Vol. 9, No. 11, November 1991, pp. 1439-1456.

The Stokes formalism represents a polarization state by a real quadrivector referred to as Stokes quadrivector or more simply Stokes vector. The components of this vector represent optical intensities. Given a quasi-monochromatic plane wave (polarized or not). The Stokes quadrivector S is defined based on the electric field as follows:

$$\vec{S} = \begin{bmatrix} S0 \\ S1 \\ S2 \\ S3 \end{bmatrix} = \begin{bmatrix} <|Ex(t)|2 + |Ey(t)|2> \\ <|Ex(t)|2 - |Ey(t)|2> \\ 2<|Ex(t)||Ey(t)|\cos(\_x(t) - \_y(t))> \\ 2<|Ex(t)||Ey(t)|\sin(\_x(t) - \_y(t))> \end{bmatrix}$$

The notation <x(t)> designates the time average of x:

$$<x> = \frac{1}{T}\int_0^T x(t)dt$$

where the integration time T is generally chosen high enough so that <x> is independent of T.

The Stokes vector associated with a field may be written as follows:

$$\vec{S} = \begin{bmatrix} S0 \\ S1 \\ S2 \\ S3 \end{bmatrix} = \begin{bmatrix} S0 \\ S0 \cos(2\theta)\cos(2\varepsilon) \\ S0 \sin(2\theta)\cos(2\varepsilon) \\ S0 \sin(2\varepsilon) \end{bmatrix}$$

where $\theta$ is the azimuth angle and $\varepsilon$ is the ellipticity angle. $\theta$ defines the inclination of the polarization ellipse and $\varepsilon$ the ellipticity thereof. $\varepsilon$ is positive for the right polarizations and negative for the left polarizations.

For a perfectly polarized field, the components of the Stokes vector verify:

$S0^2 = S1^2 + S2^2 + S3^2$.

The Stokes formalism makes it possible to use a very practical representation of the polarization states: the Poincaré sphere. If the Stokes vector of an optical wave is normalized, it is written as follows:

$$\hat{S} = \frac{1}{S0}\begin{bmatrix} S0 \\ S1 \\ S2 \\ S3 \end{bmatrix} = \begin{bmatrix} 1 \\ \cos(2\theta)\cos(2\varepsilon) \\ \sin(2\theta)\cos(2\varepsilon) \\ \sin(2\varepsilon) \end{bmatrix}$$

The three last components characterize the polarized part of the wave.

Figure 5:
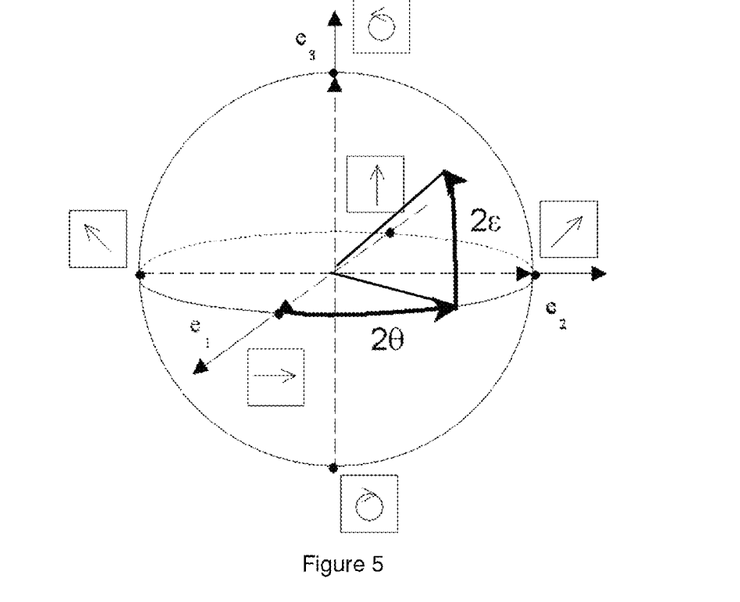
FIG. 5 shows a polarization vector on the Poincaré sphere.

They may be interpreted as the coordinates (azimuth, elevation) of a point on a sphere. The polarization states can therefore be represented on a sphere. They are fully characterized by the azimuth $\theta$ and the ellipticity $\varepsilon$, with the sphere radius being normalized to the unity. The Poincaré sphere is schematically shown in FIG. 5.

A point on the Poincaré sphere is localized with respect to three axes: $e_1$ the horizontal linear polarization, $e_2$ the linear polarization at 45° and $e_3$ the right circular polarization. The linear polarizations are located on the equator of the sphere. The left and right circular polarizations are at the bottom and top poles of the sphere. The right elliptic polarizations are in the upper hemisphere.

Two orthogonal polarizations are represented by diametrically opposite points on the sphere, i.e. opposite Stokes vectors.

Indeed, the angles on the sphere are doubled with respect to the physical world.

A vector can be defined for the PMD, based on:
the main polarization states;
the DGD.

The polarization dispersion vector is defined in the Stokes space by $\vec{\Omega}$=DGD.$\hat{p}$, for a given length z. This vector is defined at a given optical frequency, but includes all the fiber up to the abscissa z; it dictates the evolution of the polarization along z. The infinitesimal rotation law for the polarization dispersion can be written:

$$\frac{\partial \hat{s}}{\partial \omega} = \vec{\Omega} * \hat{s}$$

This equation can be used as a definition of the polarization dispersion vector. For an input polarization independent of the frequency, the evolution of the polarization follows a circle on the Poincaré sphere, around the axis defined by the polarization dispersion vector, at a speed given by the PMD; the rotation frequency period is equal to:

$$\Delta\omega_{cycle} = \frac{2\pi}{DGD}$$

This equation links directly the evolution of the polarization in the frequency domain to the time effects of the PMD by the polarization dispersion vector norm.

The birefringence vector is then defined by $\vec{\beta} = \Delta\beta\hat{\beta}$ as a Stokes vector having for direction the slow eigenmode of polarization and for norm $\Delta\beta$.

The dynamic equation of the PMD is written:

$$\frac{\partial \vec{\Omega}}{\partial z} = \frac{\partial \vec{\beta}}{\partial \omega} + \vec{\beta} * \vec{\Omega}$$

This equation is at the base of the PMD theory. It links the macroscopic notion of polarization dispersion (left) to the local notion of birefringence (right). It governs the evolution of the polarization dispersion vector with the distance. In the right member of the equation, the first term dictates the evolution of the DGD. The second term affects only the direction of the polarization dispersion vector.

In the case of a fiber operating in intrinsic regime, the measurement of the PMD with the polarization state as a function of the wavelength (cf. for example the method described in Measurement of Polarization-Mode Dispersion, by Brian L. Heffner and Paul R. Hernday in Hewlett-Packard Journal, February 1995, using a polarization analyzer and a wavelength-tunable laser source) is thus a rotation on the Poincaré sphere around the birefringence axis of the fiber and the diameter of this circle is a function of the alignment of the input polarization with the main axes of the fiber (cf. FIG. 7).

In the case of a fiber operating in coupled regime, i.e. fibers whose length is far longer than the correlation length of the fiber, the birefringence vector varies along the fiber. Then, the PMD becomes a non-determinist phenomenon. The evolution of the polarization then occurs along a random curve on the Poincaré sphere. This random displacement on the Poincaré sphere may cover the whole sphere.

For example, for a standard SM fiber, a very long fiber length (L higher than 40 km) and a very large variation of wavelength (about 100 nm) are required to cover the whole Poincaré sphere. Accordingly, FIG. 6 shows the variations of the polarization dispersion vector for a SMF fiber of 40 km long on a representation of the Poincaré sphere (Agilent 8509B Lightwave Polarization Analyzer Product Overview (1993)).

Figure 7:
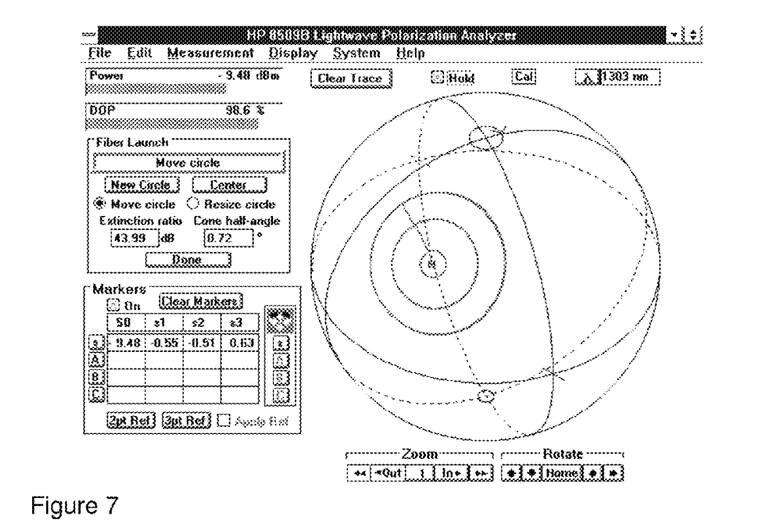
FIG. 7 shows an example of variation of the polarization vector through a polarization maintaining fiber showing the alignment of the initial polarization with the axes of the fiber.

On the contrary, a polarization maintaining (PM) fiber operating in intrinsic regime is represented by a circle on the Poincaré sphere, whose cone half-angle depends on the alignment between the polarizer and a main axis of the fiber at the input and the output of the coil. FIG. 7 shows different shaded circles on the Poincaré sphere, each circle corresponding to a misalignment between the axes of the fiber and the axis of the polarizer (a perfect alignment corresponds to a point on the sphere). The spectral width of the source is herein 100 nm, obtained by varying a narrow source over a band of 100 nm.

Figure 6:
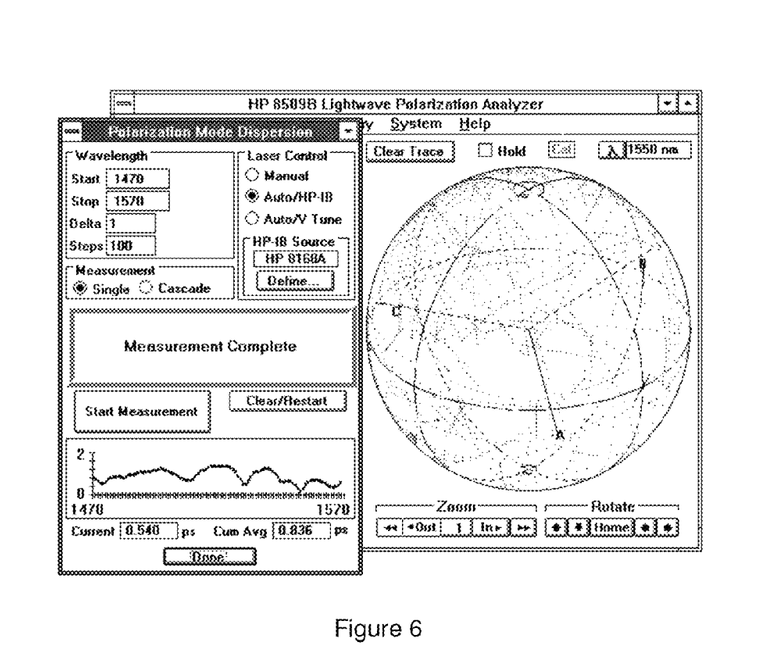
FIG. 6 shows an example of variation of the polarization vector for a wavelength variation between 1470 nm and 1570 nm through a SM fiber of 40 km long.

In the case of $HPMD_c$ fibers, the whole Poincaré sphere is randomly covered, as in the case of the SM fiber of FIG. 6, but with far lower spectral width and length: for coil lengths of the order of 0.1 km to 10 km and a spectrum of the order of the nm.

Figure 8:
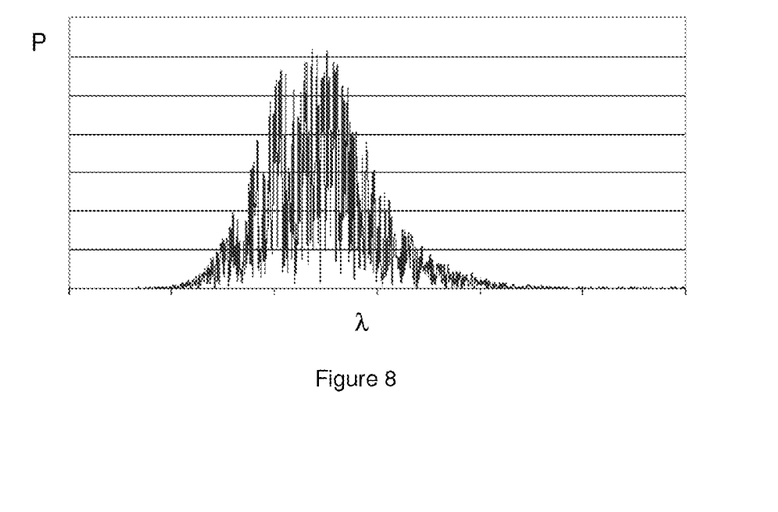
FIG. 8 shows the spectrum of a source of central wavelength 1532 nm and spectral width $\Delta\lambda_{FWHM} \approx 5$ nm after transmission through a HPMD$_c$ fiber between polarizer and analyzer.

The effect of polarization scrambling induced by a $HPMD_c$ fiber on the spectrum of the source passing through this $HPMD_c$ between polarizer and analyzer can also be observed. A noisy spectrum with a source of $\Delta\lambda_{FWHM}$=5 nm (FWHM, Full Width at Half Maximum) and a $HPMD_c$ fiber of 4 km long can be observed on the curve of FIG. 8. Indeed, the more noisy the spectrum, the more scrambled the light polarization and the better the system for a FOG.

The invention uses a long enough $HMPD_c$ fiber with high polarization mode dispersion (PMD) in coupled regime, generating polarization scrambling. In doing so, the FOG of the invention avoids the use of polarization maintaining fibers as well as the use of fibers without polarization maintaining associated with Lyot depolarizers.

The manufacturing of a FOG according to the invention is therefore simplified: the problem of the manufacturing and integration of the Lyot depolarizers in the Sagnac interferometer does not exist anymore and the connection to the input-output polarizer is no longer carried out with the constraint of alignment of the fiber main modes and the polarizer axis because the Sagnac interferometer of the FOG according to the invention does not have a preferred geometric axis. The FOG according to the invention is of easier and cheaper industrial manufacturing so that the use of the FOGs can be generalized.

Figure 1:
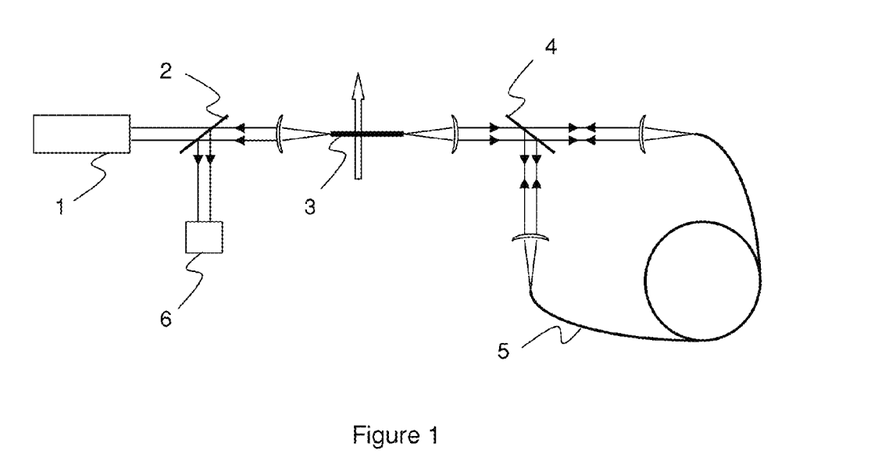
FIG. 1 schematically shows a fiber-optic gyroscope.

FIG. 1 schematically shows a fiber-optic gyroscope of the invention. The FOG comprises a wide-spectrum source 1; two beam splitters 2 and 4; an input-output polarization and spatial filter 3; a coil 5 comprising N turns of a single-mode optical fiber with a high PMD in coupled regime, scrambling the polarization; and a detector 6. The operation of such a FOG is similar to that of a FOG with a coupled-regime SM fiber or an intrinsic-regime PM fiber. However, the FOG of the invention comprises no Lyot depolarizer and does not operate in intrinsic regime.

In order for the coupled-regime high-PMD fiber to be a line polarization scrambler, it is required that this fiber actually operates in coupled regime and that the DGD is higher than the decoherence time of the source used:

$$DGD > \tau_{dc},$$

where $\tau_{dc}$ for a source can be defined as:

$$\tau_{dc} = \frac{\lambda^2}{c \cdot \Delta\lambda_{FWHM}}$$

with $\Delta\lambda_{FWHM}$ the full width at half maximum of the source.

The polarization scrambling being a random phenomenon in coupled regime, there is always half the light that passes through the polarizer of the FOG, which thus ensures the constant sensitivity of the system.

However, one of the also significant parameters in a fiber-optic gyroscope is the stability of its scale factor, defined as being the slope of the phase curve measured as a function of the rotation speed. The scale factor is reversely proportional to the average wavelength of the light going back to the detector. If $DGD = \tau_{dc}$, only a small surface of the Poincaré surface is covered, and the average wavelength is thus not very stable. For high performance gyroscopes, it is desirable to ensure that $DGD > 100\tau_{dc}$ or even $DGD > 1000 \times \tau_{dc}$, which makes it possible to sweep the whole Poincaré sphere and then to ensure high scale-factor performances. Therefore, for a source of the Erbium-type with a central wavelength of 1530 nm, having a line width of the order of 5 nm, the stability of the average wavelength is of a few $10^{-3}$ when the DGD is of the order of $\tau_{dc}$ and of a few $10^{-6}$ when the DGD is of the order of a hundred of $\tau_{dc}$.

It is to be noted than, with the use of a coupled-regime high-PMD fiber, the invention goes against the practice according to the prior art. Indeed, according to the prior art, the spreading of an input pulse due to the PMD of a fiber deteriorates the capacity of this fiber in terms of bandwidth. The prior art thus aims to produce fibers with PMD values that are low, stable in time and insensitive to the variations of the surrounding conditions.

A particular exemplary embodiment of the coupled-regime high-PMD optical fiber used in the FOG according to the invention has the physical properties given in the following table:

| | Unit | Coupled-regime high-PMD fiber |
|---|---|---|
| Operating wavelength | nm | 1550 |
| Optical losses | α (dB/km) | <1 |
| PMDi | ps/km$^{1/2}$ | 500 |
| PMDc | ps/km | 150 (1 to 1000) |
| Cut-off wavelength | $\lambda_c$ (nm) | =1300 |
| Numerical aperture | N.A. | 0.15 |
| Mode field diameter | M.F.D. (μm) | 7.5 +/− 1 |
| Outer diameter (of the quartz part) | O.D. (μm) | 80 +/− 1 |
| Coating diameter (diameter of the acrylate part) | C.D. (μm) | 175 +/− 10 |
| Bend performance | B.P. (dB/km) | <1 |
| Percent elongation at break | P.T.L. (%) | <1% |
| Core/clad concentricity | C.C.E. (μm) | <1 |
| Temperature range | ° C. | −40/+85 |

Of course, the one skilled in the art will understand that optical fibers having a high PMD in coupled regime at all the wavelengths and in particular for applications at 820 nm or at 1310 nm can be developed.

It has been observed that a FOG according to the invention has performances similar to those obtained with a known FOG of the first type comprising a polarization maintaining fiber.

Advantageously, it has been observed that the high-PMD fiber is potentially easier to manufacture than the polarization maintaining fiber. A HPMD$_c$ fiber may be made with a technology similar to that of the PM fibers (stress bars or elliptic core) but with reduction of its birefringence (ΔN$_{eff}$ of the order of 1 to $2 \cdot 10^{-4}$ compared to $5 \cdot 10^{-4}$ for a PM fiber), which significantly simplify its manufacturing. This enables to reduce manufacturing costs. This also makes it possible to obtain longer fibers and to make greater coils for the gyroscopes, increasing accordingly the sensitivity the so-made FOGs.

Of course, because the high-PMD fiber has no preferred direction, it is possible to make welds in the fiber of the coil without modifying the FOG performances. This allows welding repairs in the coil, coil length increasing.

Therefore, it seems to be possible to make HPMD$_c$ fibers having a smaller diameter than polarization maintaining PM fibers and thus to improve the gyroscopes compactness.

Advantageously, it has been observed that a FOG according to the invention has a lower sensitivity to magnetic fields than a known FOG of the first type comprising a polarization maintaining fiber.

Although the invention has been described with reference to a particular embodiment, it is not limited thereto. It includes all the technical equivalents to the means described as well as their combinations, which are within the framework of the invention.

The invention claimed is:

1. A fiber-optic interferometer, including:
   a wideband optical source (1) capable of emitting an incident optical beam with a central wavelength λ and a spectral width Δλ$_{FWHM}$, having a decoherence time $\tau_{DC} = \lambda^2/(c \cdot \Delta\lambda_{FWHM})$,
   a coil with N turns of a single-mode optical fiber (5) of total length L, said fiber (5) having a first and a second ends,
   optical means capable of splitting the incident beam into a first and a second beam and of coupling the first beam to the first end and the second beam to the second end of the optical fiber (5), respectively, so that the first beam travels through the optical fiber (5) in a first direction and the second beam travels through the optical fiber (5) in a counter-propagating direction, said optical means being capable of combining into an output beam the two beams emerging respectively from the two ends after propagation through the fiber (5),
   a detector capable of detecting the interference of the output beam,
   characterized in that
   the optical fiber (5) is a high polarization mode dispersion (PMD) optical fiber,
   the length L of the optical fiber coil (5) is higher than twice the correlation length of the fiber (5), $L > 2 \cdot L_c$, so that the fiber (5) operates in coupled PMD regime and
   the group propagation time differential (DGD) between two orthogonal polarization states cumulated over the length L of the fiber (5) is higher that the decoherence time of the source:

$DGD > \tau_{DC}$.

2. A fiber-optic gyroscope comprising an interferometer according to claim 1, characterized in that:
   the optical means include a bidirectional optical splitter (4) capable of spatially splitting the incident beam into a first and a second beam coupled to the first and the second end of the optical fiber (5), respectively, so that the first beam travels through the optical fiber (5) in a first direction and the second beam travels through the optical fiber (5) in a counter-propagating direction, said splitter (4) being capable of combining into an output beam the two beams emerging respectively from the two ends after propagation through the fiber (5), and
   a spatial single-mode filter and a polarizer (3) capable of receiving the incident beam from the source and of transmitting said linearly polarized, spatial single-mode incident beam to the optical splitter (4).

3. A gyroscope according to claim 2, characterized in that it comprises a splitter (2) capable of spatially splitting the incident beam coming from the source and the output beam and of transmitting the incident beam to the fiber coil (5) and the output beam to the detector (6), respectively.

4. A gyroscope according to claim 2, characterized in that the optical fiber (5) has a DGD cumulated over the length L of the fiber (5) higher than one hundred times the decoherence time of the source $DGD > 100 \cdot \tau_{DC}$.

5. A gyroscope according to claim 2, characterized in that the optical fiber (5) is a birefringent fiber having a PMD coefficient in coupled mode, PMD$_c$, comprised between 1 and 1000 ps/√km.

6. A gyroscope according to claim 2, characterized in that the optical fiber (5) is a birefringent fiber having a group effective index difference between orthogonal polarization modes $$\left( \Delta Neff = \Delta n_{eff} - \lambda \times \frac{d\Delta n_{eff}}{d\lambda} \right)$$

at the wavelength λ comprised between $10^{-6}$ and $2 \cdot 10^{-4}$.

7. A gyroscope according to claim 2, characterized in that the length L of the fiber coil (5) is comprised between 0.1 km and 20 km.

8. A gyroscope according to claim 7, characterized in that the wavelength λ of the source is comprised between 800 and 1600 nm and in that the spectral width Δλ$_{FWHM}$ is comprised between 0.1% and 10% of λ.

9. An inertial navigation system comprising a gyroscope according to claim 1.

10. A gyroscope according to claim 3, characterized in that the optical fiber (5) has a DGD cumulated over the length L of the fiber (5) higher than one hundred times the decoherence time of the source $$DGD > 100 \cdot \tau_{DC}.$$

11. A gyroscope according to claim 3, characterized in that the optical fiber (5) is a birefringent fiber having a PMD coefficient in coupled mode, $PMD_c$, comprised between 1 and 1000 ps/√km.

12. A gyroscope according to claim 4, characterized in that the optical fiber (5) is a birefringent fiber having a PMD coefficient in coupled mode, $PMD_c$, comprised between 1 and 1000 ps/√km.

13. A gyroscope according to claim 3, characterized in that the optical fiber (5) is a birefringent fiber having a group effective index difference between orthogonal polarization modes $$\left( \Delta Neff = \Delta n_{eff} - \lambda \times \frac{d\Delta n_{eff}}{d\lambda} \right)$$

at the wavelength λ comprised between $10^{-6}$ and $2.10^{-4}$.

14. A gyroscope according to claim 4, characterized in that the optical fiber (5) is a birefringent fiber having a group effective index difference between orthogonal polarization modes $$\left( \Delta Neff = \Delta n_{eff} - \lambda \times \frac{d\Delta n_{eff}}{d\lambda} \right)$$

at the wavelength λ comprised between $10^{-6}$ and $2.10^{-4}$.

15. A gyroscope according to claim 5, characterized in that the optical fiber (5) is a birefringent fiber having a group effective index difference between orthogonal polarization modes $$\left( \Delta Neff = \Delta n_{eff} - \lambda \times \frac{d\Delta n_{eff}}{d\lambda} \right)$$

at the wavelength λ comprised between $10^{-6}$ and $2.10^{-4}$.

16. A gyroscope according to claim 3, characterized in that the length L of the fiber coil (5) is comprised between 0.1 km and 20 km.

17. A gyroscope according to claim 4, characterized in that the length L of the fiber coil (5) is comprised between 0.1 km and 20 km.

18. A gyroscope according to claim 5, characterized in that the length L of the fiber coil (5) is comprised between 0.1 km and 20 km.

19. A gyroscope according to claim 6, characterized in that the length L of the fiber coil (5) is comprised between 0.1 km and 20 km.

20. An inertial navigation system comprising a gyroscope according to claim 2.

* * * * *